US009832695B2

(12) United States Patent
Liu et al.

(10) Patent No.: US 9,832,695 B2
(45) Date of Patent: Nov. 28, 2017

(54) METHOD, DEVICE, NETWORK ELEMENT AND SYSTEM FOR SWITCHING A NETWORK

(71) Applicant: CHINA MOBILE COMMUNICATIONS CORPORATION, Beijing (CN)

(72) Inventors: Dapeng Liu, Beijing (CN); Hui Deng, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 218 days.

(21) Appl. No.: 14/415,388

(22) PCT Filed: Jun. 19, 2013

(86) PCT No.: PCT/CN2013/077451
§ 371 (c)(1),
(2) Date: Jan. 16, 2015

(87) PCT Pub. No.: WO2014/012408
PCT Pub. Date: Jan. 23, 2014

(65) Prior Publication Data
US 2015/0223128 A1    Aug. 6, 2015

(30) Foreign Application Priority Data

Jul. 17, 2012    (CN) .......................... 2012 1 0248398

(51) Int. Cl.
*H04W 4/00*    (2009.01)
*H04L 12/28*   (2006.01)
(Continued)

(52) U.S. Cl.
CPC ........ *H04W 36/14* (2013.01); *H04W 36/0011* (2013.01); *H04W 36/36* (2013.01); *H04W 76/022* (2013.01); *H04W 84/12* (2013.01)

(58) Field of Classification Search
CPC ... H04W 36/14; H04W 36/36; H04W 76/022; H04W 36/0011; H04W 84/12
See application file for complete search history.

(56) References Cited

U.S. PATENT DOCUMENTS 8,830,961 B2    9/2014  Hori et al.
2005/0271013 A1* 12/2005 Shaheen ................ H04L 41/08
                                              370/331
(Continued)

FOREIGN PATENT DOCUMENTS

CN    101453766 A    6/2009
CN    101562853 A    10/2009
WO   WO 2011/118196 A1    9/2011

OTHER PUBLICATIONS

State Intellectual Property Office of the People's Republic of China, International Search Report in International Application No. PCT/CN2013/077451 (dated Sep. 26, 2013).

(Continued)

*Primary Examiner* — Kiet Tang
(74) *Attorney, Agent, or Firm* — Leydig, Voit & Mayer, Ltd.

(57) ABSTRACT

The present invention provides a method, a device, a network element and a system for-switching a network. The method may include: obtaining, through a first network that a terminal accesses, a message required by a preparation process before the terminal switches to a second network; alternating with the second network according to the message, after the preparation process before the switching is completed, releasing a first connection so as to make the terminal directly establish a connection to the second network after releasing the first connection channel. According to the solution of the present invention, the problem of interference generated when two networks switch is avoided.

11 Claims, 3 Drawing Sheets

(51) Int. Cl.
*H04W 36/00* (2009.01)
*H04W 36/14* (2009.01)
*H04W 36/36* (2009.01)
*H04W 76/02* (2009.01)
*H04W 84/12* (2009.01)

(56) References Cited

U.S. PATENT DOCUMENTS

| | | | |
|---|---|---|---|
| 2006/0002355 A1* | 1/2006 | Baek | H04W 36/14 370/338 |
| 2006/0029084 A1* | 2/2006 | Grayson | H04L 12/14 370/401 |
| 2007/0021119 A1* | 1/2007 | Lee | H04W 36/0066 455/436 |
| 2013/0039343 A1 | 2/2013 | Hori et al. | |

OTHER PUBLICATIONS

State Intellectual Property Office of the People's Republic of China, First Office Action in Chinese Patent Application No. 201210248398.1 (dated Nov. 30, 2015).

State Intellectual Property Office of the People's Republic of China, Second Office Action in Chinese Patent Application No. 201210248398.1 (dated May 5, 2016).

* cited by examiner

METHOD, DEVICE, NETWORK ELEMENT AND SYSTEM FOR SWITCHING A NETWORK

CROSS-REFERENCE TO RELATED APPLICATIONS

This patent application is the U.S. national phase of International Application No. PCT/CN2013/077451, filed on Jun. 19, 2013, which claims priority to Chinese Patent Application No. 201210248398.1, filed on Jul. 17, 2012, the disclosures of which are incorporated by reference.

TECHNICAL FIELD

The present disclosure relates to the field of mobile communication technology, in particular to a method, a device, a network element and a system used for network switching.

BACKGROUND

Switching and mobility management is one of the basic problems of the mobile communication system. In the related art, the mobility management of a Third ($3^{rd}$) Generation Partnership Project (3GPP) network uses a mobility management mechanism based on GPRS Tunnelling Protocol (GTP) in which an Internet Protocol (IP) layer address can be ensured to be unchanged before and after switching, and thus job continuity can be maintained. Similarly, Internet Engineering Task Force (IETF) has also developed IP-based mobility management protocols, including Mobile IPv4 (MIPv4)/Mobile IPv6 (MIPv6)/Dual Stack Mobile IPv6 (DSMIPv6) and the like. With the evolution of network gradually towards the direction of isomerization, a trend of gradual integration between Wireless Local Area Networks (WLAN) and cellular networks is more and more apparent. A mobility management technology of switching between WLAN and cellular networks has been defined in the current 3GPP, which includes three types of solutions, such as S2a, S2b and S2c interfaces.

In the related art, a switching between WLAN and cellular networks uses a method so called "make before break", which firstly establishes a link to a target network, and then disconnects a link to the source network after completing the switching. During this process, wireless interfaces of the WLAN and the cellular networks are required to be opened simultaneously, which will cause wireless interference problems, especially in a case of switching between Long Term Evolution (LTE) networks and WLAN.

SUMMARY

Technical problem to be solved by the present disclosure is to provide a method, a device, a network element and a system used for network switching to avoid interference problems generated during switching between two networks.

To solve the above technical problem, an embodiment of the present disclosure provides a method for network switching, including:

obtaining a message required for a switching preparation process before a terminal is switched to a second network via a first network accessed by the terminal currently;

interacting with the second network based on the message, and releasing a first connection channel after completing the switching preparation process, so as to enable the terminal to establish a connection to the second network immediately after releasing the first connection channel.

Alternatively, before the step of releasing the first connection channel, the method may further include:

obtaining an Internet Protocol (IP) address of the second network accessed by the terminal; and transmitting the IP address to the terminal via the first connection channel.

Alternatively, the first network may be a 3rd Generation Partnership Project (3GPP) network, and the second network may be a Wireless Local Area Networks (WLAN) network; wherein the step of obtaining the message required by the switching preparation process before the terminal is switched to the second network via the first network accessed by the terminal currently may include:

establishing the first connection channel which is connected to the first network accessed by the terminal currently and is a layer3 tunnelling based on an IP protocol; and obtaining the message which is encapsulated by the first connection channel and required by the switching preparation process before the terminal is switched to the second network via the first connection channel.

Alternatively, the switching preparation process before the terminal is switched may include:

decapsulating the message which is encapsulated by the first connection channel and required by the switching preparation process before the terminal is switched to the second network, and obtaining the message which is required by the switching preparation process before the terminal is switched;

establishing a second connection channel which is connected to the second network and is a layer3 tunnelling based on the Control And Provisioning of Wireless Access Points (CAPWAP) protocol;

transmitting the message which is required by the switching preparation process before the terminal is switched to an authentication network element of the second network via the second connection channel; and obtaining an authentication confirmation message feedbacked after an authentication by the authentication network element is successful.

Alternatively, the first connection channel connected to the first network may be connected to a gateway network element in the first network; and the message required by the switching preparation process before the terminal is switched may include an association message and a connection authentication message on an 802.11 layer2.

Alternatively, the first network may be a WLAN network and the second network may be a 3GPP network; wherein the step of obtaining the message required by the switching preparation process before the terminal is switched to the second network via the first network accessed by the terminal currently may include:

establishing the first connection channel which is connected to the first network accessed by the terminal currently and is a layer3 tunnelling based on a layer3 tunnelling protocol; and obtaining the message which is encapsulated by the first connection channel and required by the switching preparation process before the terminal is switched to the second network via the first connection channel.

Alternatively, the switching preparation process before the terminal is switched may include:

decapsulating the message which is encapsulated by the first connection channel and required by the switching preparation process before the terminal is switched to the second network, and obtaining the message which is required by the switching preparation process before the terminal is switched;

establishing a Packet Data Protocol (PDP) link connected to the second network;

transmitting a message required by the PDP link to an authentication network element in the second network via the PDP link; and obtaining a confirmation message which reflects that the PDP link has been successfully activated feedbacked by the authentication network element after an activation of the PDP link is successful.

Another embodiment of the present disclosure further provides a device for network switching, including:

a first obtaining module, configured to obtain a message required for a switching preparation process before a terminal is switched to a second network via a first network accessed by the terminal currently; and a processing module, configured to interact with the second network based on the message, and releasing a first connection channel after completing the switching preparation process, so as to enable the terminal to establish a connection to the second network immediately after releasing the first connection channel.

Alternatively, the device may further include:

a second obtaining module, configured to obtain an Internet Protocol (IP) address of the second network accessed by the terminal before releasing the first connection channel; and a transmitting module, configured to transmit the IP address to the terminal via the first connection channel.

Another embodiment of the present disclosure further provides a network element, including the above device.

Another embodiment of the present disclosure further provides a network system, including a first network, and a second network, wherein the network system further includes the above network element.

Another embodiment of the present disclosure further provides a method for a network switching, including:

establishing a first connection channel which is connected to a 3GPP network accessed by a terminal currently and is a layer3 tunnelling based on an IP protocol;

obtaining the message which is encapsulated by the first connection channel and required by the switching preparation process before the terminal is switched to a WLAN network via the first connection channel;

decapsulating the message which is encapsulated by the first connection channel and required by the switching preparation process before the terminal is switched to the WLAN network, and obtaining the message which is required by the switching preparation process before the terminal is switched;

interacting with the WLAN network based on the message, and establishing a second connection channel which is connected to the WLAN network and is a layer3 tunnelling based on the CAPWAP protocol;

transmitting the message which is required by the switching preparation process before the terminal is switched to an authentication network element of the WLAN network via the second connection channel;

obtaining an authentication confirmation message feedbacked after an authentication by the authentication network element is successful;

obtaining an IP address of the WLAN network accessed by the terminal;

transmitting the IP address to the terminal via the first connection channel; and releasing the first connection channel so as to enable the terminal to establish a connection to the WLAN network immediately after releasing the first connection channel.

Advantageous effects of the technical solutions provided by the present disclosure are as follows.

In the above solutions, the preparation process which is required when the terminal is switched to the second network is completed in the first network accessed by the terminal currently, so that when the terminal is decided to be switched to the second network, the preparation process for accessing the second network is not necessary to be performed any more. Therefore, when the terminal is switched to the second network, the terminal can firstly turn off a connection interface to the first network and then turn on a connection interface to the second network. The terminal just needs to re-associate to the second network to complete the switching to the second network, thereby avoids interference problem. In addition, since the major switching preparation work has been completed before the switching, the performance of the switching can be improved.

DETAILED DESCRIPTION

In order to make the technical problem, technical solutions and advantages of the present disclosure more clear, description will be given below in conjunction with the accompanying drawings and specific embodiments.

Figure 1:
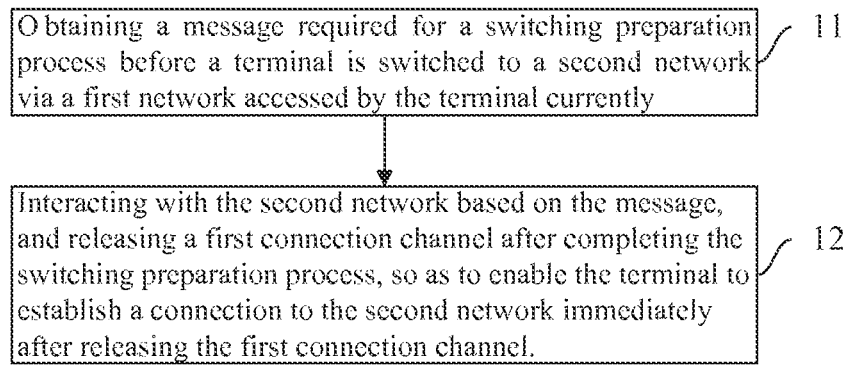
FIG. 1 is a flowchart showing a method for network switching according to a first embodiment of the present disclosure.

As shown in FIG. 1 an embodiment of the present disclosure provides a method for network switching, including:

Step 11, obtaining a message required for a switching preparation process before a terminal is switched to a second network via a first network accessed by the terminal currently; and Step 12, interacting with the second network based on the message, and releasing a first connection channel after completing the switching preparation process, so as to enable the terminal to establish a connection to the second network immediately after releasing the first connection channel.

In the embodiment, the preparation process which is required when the terminal is switched to the second network is completed in the first network accessed by the terminal currently, so that when the terminal is decided to be switched to the second network, the preparation process for accessing the second network is not necessary to be performed any more. Therefore, when the terminal is switched to the second network, the terminal can firstly turn off a connection interface to the first network and then turn on a connection interface to the second network. The terminal just needs to re-associate to the second network to complete the switching to the second network, which thereby avoids interference problems. In addition, since the major switching preparation work has been completed before the switching, the performance of the switching can be improved.

Figure 2:
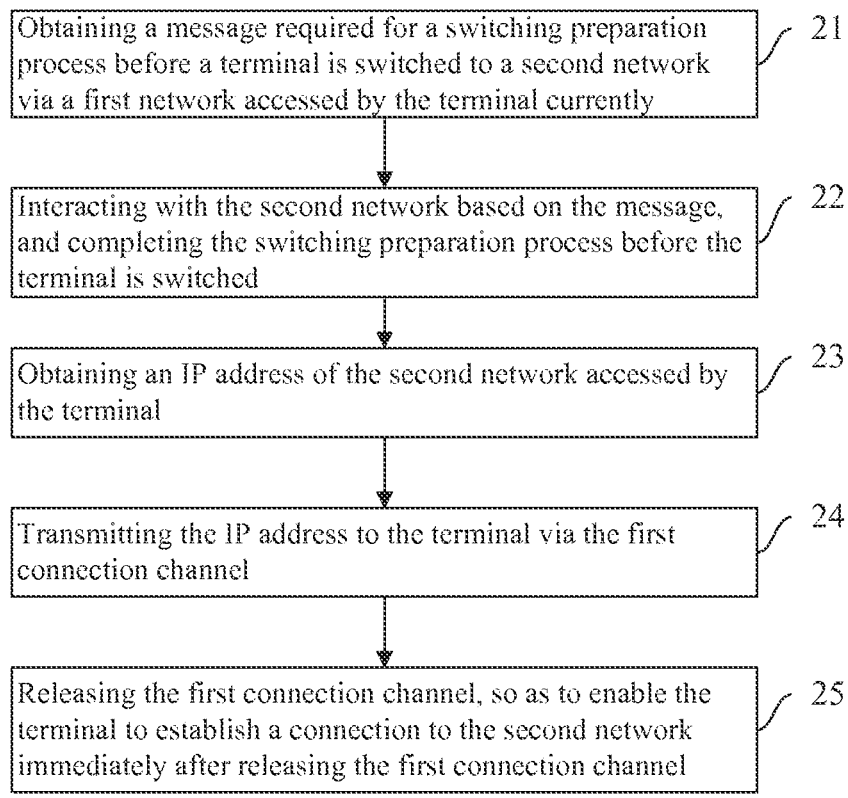
FIG. 2 is a flowchart showing a method for network switching according to a second embodiment of the present disclosure.

FIG. 2 is a flowchart showing a method for network switching according to a second embodiment of the present disclosure. As shown in FIG. 2, the method includes:

Step 21, obtaining a message required for a switching preparation process before a terminal is switched to a second network via a first network accessed by the terminal currently;

Step 22, interacting with the second network based on the message, and completing the switching preparation process before the terminal is switched;

Step 23, obtaining an Internet Protocol (IP) address/ Dynamic Host Configuration Protocol (DHCP, which is a protocol to configure IP address dynamically) of the second network accessed by the terminal;

Step 24, transmitting the IP address to the terminal via the first connection channel; and Step 25, releasing the first connection channel, so as to enable the terminal to establish a connection to the second network immediately after releasing the first connection channel.

In the embodiment, the terminal is assigned with an IP address before switching to the second network, so that the terminal does not need to obtain the IP address when the terminal is switched to the second network. Therefore, the connection to the second network can be established by re-associating the layer2 data to the second network. Therefore, during the process of switching from the first network to the second network, there is no need to turn on the connection interface to the first network and the connection interface to the second network simultaneously, thereby avoiding the interference problem between the two networks during the process of switching. In addition, since the major switching preparation work has been completed before the switching, the performance of the switching can be improved.

A first specific application of the above method for network switching according to the present disclosure will be described with an example where the first network is a 3rd Generation Partnership Project (3GPP) network and the second network is a Wireless Local Area Networks (WLAN) network. The process includes all the above-described steps shown in FIG. 2, and Step 21 may include:

Step 211, establishing the first connection channel which is connected to the first network accessed by the terminal currently and is a layer3 tunnelling based on an IP protocol, wherein the first connection channel connected to the first network is connected to a gateway network element in the first network; the gateway network element in the first network may be, for example, a Serving Gateway (S-GW) and/or a Packet Data Gateway (P-GW);

Step 212, obtaining the message which is encapsulated by the first connection channel and required by the switching preparation process before the terminal is switched to the second network via the first connection channel, wherein the message required by the switching preparation process before the terminal is switched may include an association message and a connection authentication message on an 802.11 layer2.

Further, the switching preparation process before the terminal is switched may include:

Step 213, decapsulating the message which is encapsulated by the first connection channel and required by the switching preparation process before the terminal is switched to the second network, and obtaining the message which is required by the switching preparation process before the terminal is switched;

Step 214, establishing a second connection channel which is connected to the second network and is a layer3 tunnelling based on the Control And Provisioning of Wireless Access Points (CAPWAP) protocol;

Step 215, transmitting the message which is required by the switching preparation process before the terminal is switched to an authentication network element of the second network via the second connection channel; and Step 216, obtaining an authentication confirmation message feedbacked after an authentication by the authentication network element is successful.

Figure 3:
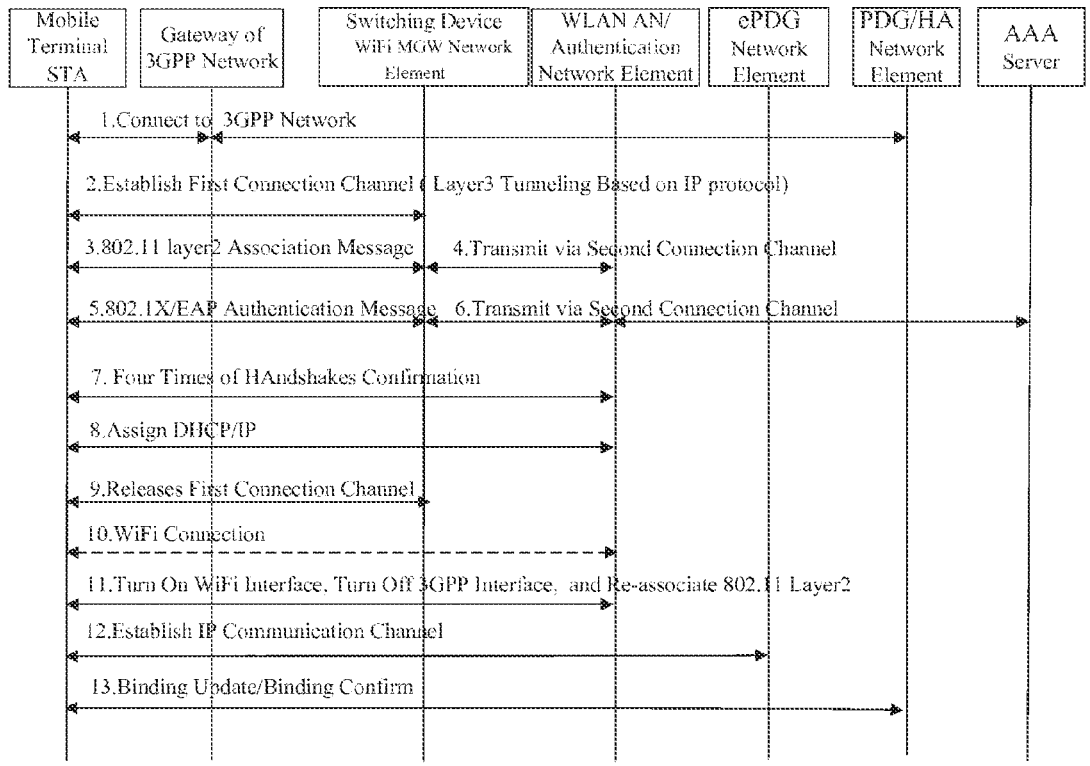
FIG. 3 is a flowchart showing a first specific application of a method for network switching according to the present disclosure.

Specifically, as shown in FIG. 3, the process may include:

1. before starting off the switching, the terminal STA is connected to a 3GPP network;

2. the terminal discovers a WLAN network, in which a network discovery method can be found in the related art, such as an Access Network Discovery and Selection Function (ANDSF) based network discovery; the terminal establish a layer3 tunnelling (i.e., the above-described first connection channel) to a WiFi MGW (switching device) via a 3GPP access network; preferably, the layer3 tunnelling is based on the IP protocol;

3. the terminal encapsulates the association message connected to an 802.11 layer2 of the WLAN network by the layer3 tunnelling, and transmits it to the WiFi MGW network element;

4. the second connection channel between the WiFi MGW network element and the second network (i.e., WLAN network) is established, and the second connection channel is also a layer3 tunnelling (e.g. a layer3 tunnelling based on the Control And Provisioning of Wireless Access Points (CAPWAP) protocol); the received 802.11 layer2 data is encapsulated by the CAPWAP tunnelling and forwarded to a network element WLAN Authenticator which is responsible for authentication in the WLAN network (in an actual implementation, the WLAN Authenticator is usually an Authentication Center (AC)); and 5. the terminal encapsulates the authentication message connected to the WLAN network by the layer3 tunnelling, and transmits it to the WiFi MGW network element;

6. the WiFi MGW network element transmits the encapsulated authentication message to the network element WLAN Authenticator in the WLAN network via the second connection channel; the WLAN Authenticator interacts with an AAA server which is responsible for authentication in the network;

7. after 4 times of handshakes, the authentication process based on 802.1X and Extensible Authentication Protocol (EAP) is completed;

8. after completing authentication process based on 802.1X and EAP, the WiFi MGW assigns an IP address via the tunnelling for the terminal, the terminal can receive the IP address assigned by the network via a virtual interface;

9. after completing the above switching preparation, the terminal releases the layer3 tunnelling to the WiFi MGW (i.e., the above first connection channel);

10. the terminal deicides to be switched to the WLAN network;

11. firstly, the 3GPP interface is turned off and then the WiFi interface is turned on; since the terminal has completed the authentication and the switching preparation, the terminal just needs to re-associate to the WLAN network to complete the switching to layer2; and 12 and 13. after establishing a WiFi link, the terminal transmits a binding registration and binding update messages of DSMIPv6 protocol to the PGW to complete the registration process; after the registration process is completed, the data transmission is switched from the 3GPP to the WLAN network.

A second specific application of the above method for network switching according to the present disclosure will be described with an example where the first network is a WLAN network and the second network is a 3GPP network. The process includes all the above-described steps shown in FIG. 2, wherein Step 21 may include:

Step 221, establishing the first connection channel which is connected to the first network accessed by the terminal currently and is a layer3 tunnelling based on a layer3 tunnelling protocol;

Step 222, obtaining the message which is encapsulated by the first connection channel and required by the switching preparation process before the terminal is switched to the second network via the first connection channel.

Further, the switching preparation process before the terminal is switched may include:

Step 223, decapsulating the message which is encapsulated by the first connection channel and required by the switching preparation process before the terminal is switched to the second network, and obtaining the message which is required by the switching preparation process before the terminal is switched;

Step 224, establishing a Packet Data Protocol (PDP) link connected to the second network;

Step 225, transmitting a message required by the PDP link to an authentication network element in the second network via the PDP link; and Step 226, obtaining a confirmation message which reflects that the PDP link has been successfully activated feedbacked by the authentication network element after an activation of the PDP link is successful.

Figure 4:
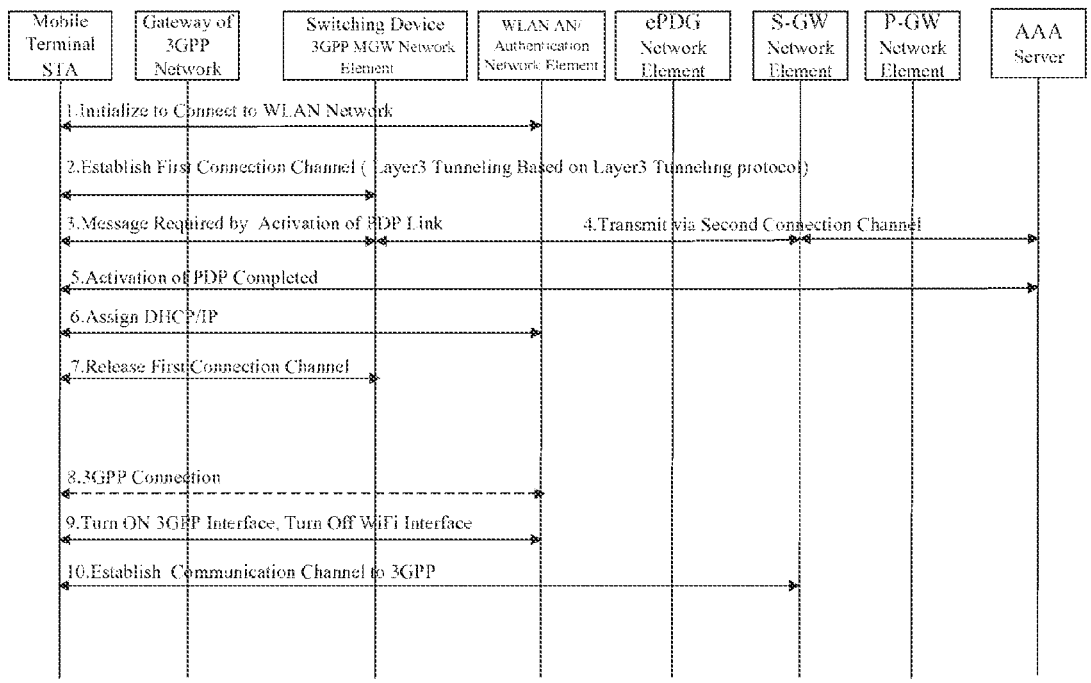
FIG. 4 is a flowchart showing a second specific application of a method for network switching according to the present disclosure.

Specifically, as shown in FIG. 4, the process includes:

1. the terminal STA is initialized to access to a WLAN network;

2. the terminal establishes the first connection channel to a switching device (i.e., 3GPP MGW gateway) via a gateway of the WLAN network, and the first connection channel is a layer3 tunnelling based on a layer3 tunnelling protocol;

3. the switching device obtains the message which is required by the activation of the Packet Data Protocol (PDP) link, which is also required by the terminal that switches to the 3GPP network via the first connection channel;

4. the switching device establishes the second connection channel to the 3GPPP network, transmits the message required by the activation of the PDP link to the gateway S-GW of 3GPP, and further forwards the message to an AAA server to authenticate the message;

5. after the authentication is successful, the activation of the PDP link is confirmed;

6. the switching device obtains an IP address or DHCP of the terminal when switching to the 3GPP network, and transmits it to the terminal via the first connection channel. Afterwards, the terminal can receive it via a virtual interface;

7. the first connection channel is released;

8. the terminal is decided to be switched to the 3GPP network and establishes a connection to the 3GPP network;

9. the 3GPP interface of the terminal is turned on and then the WLAN interface is turned off; and 10. a communication channel is established between the terminal and the 3GPP network, and then the data transmission is switched to the 3GPP network.

The main characteristics of the above embodiments of the present disclosure is not to use the method of "establishing a link to the target network firstly and disconnecting the link to the source network after completing the switching" in the switching process, but to use the method of completing the switching preparation in advance. The switching preparation includes processes such as the authentication of the target network, the assignment of an IP address and so forth. Therefore, when the terminal is switched to the second network, the terminal can firstly turn off a connection interface to the first network and then turn on a connection interface to the second network. The terminal just needs to re-associate to the second network to complete the switching to the second network, and thereby avoids interference problems. In addition, since the major switching preparation work has been completed before the switching, the performance of the switching can be improved.

An embodiment of the present disclosure further provides a device for network switching, including:

a first obtaining module, configured to obtain a message required for a switching preparation process before a terminal is switched to a second network via a first network accessed by the terminal currently; and a processing module, configured to interact with the second network based on the message, and releasing a first connection channel after completing the switching preparation process, so as to enable the terminal to establish a connection to the second network immediately after releasing the first connection channel.

In another embodiment of the present disclosure, the device may further include:

a second obtaining module, configured to obtain an Internet Protocol (IP) address of the second network accessed by the terminal before releasing the first connection channel; and a first transmitting module, configured to transmit the IP address to the terminal via the first connection channel.

When the first network is a 3GPP network and the second network is a WLAN network, the first obtaining module may include:

a first establishing module, configured to establish the first connection channel which is connected to the first network accessed by the terminal currently and is a layer3 tunnelling based on an IP protocol; and a first sub-obtaining module, configured to obtain the message which is encapsulated by the first connection channel and required by the switching preparation process before the terminal is switched to the second network via the first connection channel.

The processing module may include:

a first decapsulating module, configured to decapsulate the message which is encapsulated by the first connection channel and required by the switching preparation process before the terminal is switched to the second network, and obtain the message which is required by the switching preparation process before the terminal is switched;

a second establishing module, configured to establish a second connection channel which is connected to the second network and is a layer3 tunnelling based on the CAPWAP protocol;

a second transmitting module, configured to transmit the message which is required by the switching preparation process before the terminal is switched to an authentication network element of the second network via the second connection channel; and a second sub-obtaining module configured to obtain an authentication confirmation message feedbacked after an authentication by the authentication network element is successful.

In yet another embodiment of the present disclosure, the first network is a WLAN network and the second network is a 3GPP network; the first obtaining module may include:

a third establishing module, configured to establish the first connection channel which is connected to the first network accessed by the terminal currently and is a layer3 tunnelling based on a layer3 tunnelling protocol;

a third sub-obtaining module, configured to obtain the message which is encapsulated by the first connection channel and required by the switching preparation process before the terminal is switched to the second network via the first connection channel.

The processing module may include:

a second decapsulating module, configured to decapsulate the message which is encapsulated by the first connection channel and required by the switching preparation process before the terminal is switched to the second network, and obtain the message which is required by the switching preparation process before the terminal is switched;

a fourth establishing module, configured to establish a PDP link connected to the second network;

a third transmitting module, configured to transmit a message required by the PDP link to an authentication network element in the second network via the PDP link; and a fourth sub-obtaining module, configured to obtain a confirmation message which reflects that the PDP link has been successfully activated feedbacked by the authentication network element after an activation of the PDP link is successful.

It should be explained that, the device embodiments correspond to the above method embodiments, all the methods mentioned in the above method embodiments are suitable for the device embodiments and can achieve the same technical effects.

Another embodiment of the present disclosure further provides a network element, including the above device. Preferably, the network element is a gateway provided in a WiFi MGW of a WLAN network, and it may also be a gateway provided in a 3GPP MGW of a 3GPP network.

Another embodiment of the present disclosure further provides a network system, including a first network, and a second network, wherein the network system further includes the above network element.

Figure 5:
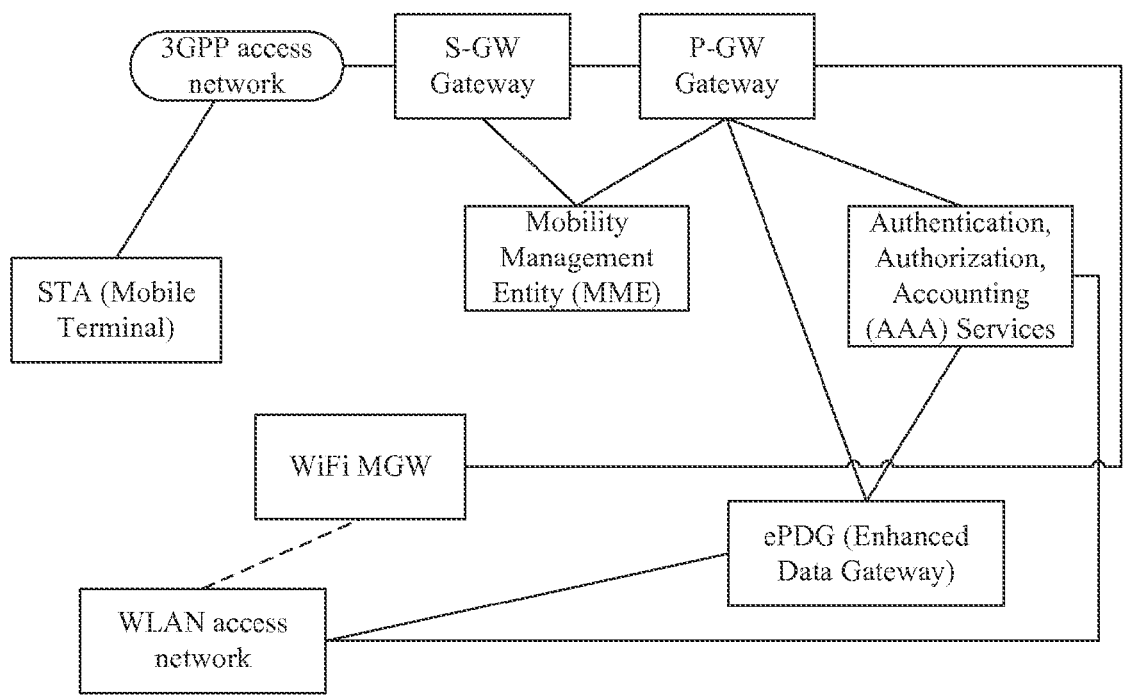
FIG. 5 is a structure diagram showing a network system in which a first network is a 3GPP network and a second network is a WLAN network.

Specifically, FIG. 5 is a structure diagram showing the network system in which the first network is a 3GPP network and the second network is a WLAN network. Herein the WiFi MGW has interfaces to the WLAN access network and the P-GW, respectively: CAPWAP defined by IETF is used between the WiFi MGW and the WLAN access network as an interface protocol, and IP tunnelling is used between the WiFi MGW and the P-GW as an interface protocol.

The above are merely the preferred embodiments of the present disclosure. It should be noted that, modifications and alterations may be made without departing from the principle of the present disclosure for a person skilled in the art, and all these modifications and alterations should also be considered to fall within the scope of the present disclosure.

What is claimed is:

1. A method for network switching, comprising:
   obtaining, via a first network accessed by a terminal, a message required for a switching preparation process before the terminal is switched to a second network; and
   interacting with the second network based on the message required for the switching preparation process, and releasing a first connection channel after completing the switching preparation process, so as to enable the terminal to establish a connection to the second network immediately after releasing the first connection channel, wherein the switching preparation process comprises an authentication process for the terminal relative to the second network;
   wherein before the step of releasing the first connection channel, an Internet Protocol (IP) address of the second network is obtained and transmitted to the terminal;
   wherein the first network is a $3^{rd}$ Generation Partnership Project (3GPP) network, and the second network is a Wireless Local Area Network (WLAN) network; and
   wherein the step of obtaining the message required by the switching preparation process further comprises:
      establishing the first connection channel, which is connected to the first network and is a layer 3 tunnel based on an IP protocol;
      obtaining the message required by the switching preparation process, which is encapsulated by the first connection channel.

2. The method according to claim 1, wherein the switching preparation process comprises:
   decapsulating the message required by the switching preparation process which is encapsulated by the first connection channel;
   establishing a second connection channel, which is connected to the second network and is a layer 3 tunnel based on the Control And Provisioning of Wireless Access Points (CAPWAP) protocol;
   transmitting the message required by the switching preparation process to an authentication network element of the second network via the second connection channel; and
   obtaining an authentication confirmation message corresponding to successful authentication by the authentication network element.

3. The method according to claim 2, wherein the first connection channel is connected to a gateway network element in the first network; and
   wherein the message required by the switching preparation process comprises an association message and a connection authentication message on an 802.11 layer 2.

4. A device for network switching, comprising:
   a memory, configured to store computer-readable instructions; and
   a processor for executing the computer-readable instructions, configured to obtain, via a first network accessed by a terminal, a message required for a switching preparation process before the terminal is switched to a second network, and to interact with the second network based on the message required for the switching preparation process, and release a first connection channel after completing the switching preparation process, so as to enable the terminal to establish a connection to the second network immediately after releasing the first connection channel;
wherein the switching preparation process comprises an authentication process for the terminal relative to the second network;
wherein the processor is further configured to obtain an Internet Protocol (IP) address of the second network before releasing the first connection channel;
wherein the device further comprises: a transmitter, configured to transmit the IP address to the terminal via the first connection channel;
wherein the first network is a $3^{rd}$ Generation Partnership Project (3GPP) network, and the second network is a Wireless Local Area Network (WLAN) network; and
wherein obtaining the message required by the switching preparation process further comprises:
establishing the first connection channel, which is connected to the first network and is a layer 3 tunnel based on an IP protocol;
obtaining the message required by the switching preparation process, which is encapsulated by the first connection channel.

5. The device according to claim 4, wherein the switching preparation process comprises:
decapsulating the message required by the switching preparation process which is encapsulated by the first connection channel;
establishing a second connection channel, which is connected to the second network and is a layer 3 tunnel based on the Control And Provisioning of Wireless Access Points (CAPWAP) protocol;
transmitting the message required by the switching preparation process to an authentication network element of the second network via the second connection channel; and
obtaining an authentication confirmation message corresponding to successful authentication by the authentication network element.

6. The device according to claim 5, wherein the first connection channel is connected to a gateway network element in the first network; and
wherein the message required by the switching preparation process comprises an association message and a connection authentication message on an 802.11 layer 218.

7. A method for network switching, comprising:
establishing a first connection channel, which is connected to a 3rd Generation Partnership Project (3GPP) network accessed by a terminal and is a layer 3 tunnel based on an Internet Protocol (IP) protocol;
obtaining, via the first communication channel, a message required by a switching preparation process before the terminal is switched to a Wireless Local Area Network (WLAN) network, wherein the message required by the switching preparation process is encapsulated by the first connection channel;
decapsulating the message required by the switching preparation process which is encapsulated by the first connection channel;
interacting with the WLAN network based on the message required by the switching preparation process, and establishing a second connection channel which is connected to the WLAN network and is a layer 3 tunnel based on the Control And Provisioning of Wireless Access Points (CAPWAP) protocol;
transmitting the message required by the switching preparation process to an authentication network element of the WLAN network via the second connection channel;
obtaining an authentication confirmation message corresponding to successful authentication by the authentication network element;
obtaining an Internet Protocol (IP) address of the WLAN network;
transmitting the IP address to the terminal via the first connection channel; and
releasing the first connection channel so as to enable the terminal to establish a connection to the WLAN network immediately after releasing the first connection channel.

8. A method for network switching, comprising:
obtaining, via a first network accessed by a terminal, a message required for a switching preparation process before the terminal is switched to a second network; and
interacting with the second network based on the message required for the switching preparation process, and releasing a first connection channel after completing the switching preparation process, so as to enable the terminal to establish a connection to the second network immediately after releasing the first connection channel, wherein the switching preparation process comprises an authentication process for the terminal relative to the second network;
wherein before the step of releasing the first connection channel, an Internet Protocol (IP) address of the second network is obtained and transmitted to the terminal;
wherein the first network is a Wireless Local Area Network (WLAN) network, and the second network is a $3^{rd}$ Generation Partnership Project (3GPP) network; and
wherein the step of obtaining the message required by the switching preparation process further comprises:
establishing the first connection channel, which is connected to the first network and is a layer 3 tunnel;
obtaining, via the first connection channel, the message required by the switching preparation process, which is encapsulated by the first connection channel.

9. The method according to claim 8, wherein the switching preparation process comprises:
decapsulating the message required by the switching preparation process which is encapsulated by the first connection channel;
establishing a Packet Data Protocol (PDP) link connected to the second network;
transmitting a message required by the PDP link to an authentication network element in the second network via the PDP link;
obtaining a confirmation message corresponding to successful activation of the PDP link from the authentication network element.

10. A device for network switching, comprising:
a memory, configured to store computer-readable instructions; and
a processor for executing the computer-readable instructions, configured to obtain, via a first network accessed by a terminal, a message required for a switching preparation process before the terminal is switched to a second network, and to interact with the second network based on the message required for the switching preparation process, and release a first connection channel after completing the switching preparation process, so as to enable the terminal to establish a connection to the second network immediately after releasing the first connection channel;

wherein the switching preparation process comprises an authentication process for the terminal relative to the second network;

wherein the processor is further configured to obtain an Internet Protocol (IP) address of the second network before releasing the first connection channel;

wherein the device further comprises: a transmitter, configured to transmit the IP address to the terminal via the first connection channel;

wherein the first network is a Wireless Local Area Network (WLAN) network, and the second network is a $3^{rd}$ Generation Partnership Project (3GPP) network; and wherein obtaining the message required by the switching preparation process further comprises:

establishing the first connection channel, which is connected to the first network and is a layer 3 tunnel;

obtaining, via the first connection channel, the message required by the switching preparation process, which is encapsulated by the first connection channel.

11. The device according to claim 10, wherein the switching preparation process comprises:

decapsulating the message required by the switching preparation process which is encapsulated by the first connection channel;

establishing a Packet Data Protocol (PDP) link connected to the second network;

transmitting a message required by the PDP link to an authentication network element in the second network via the PDP link;

obtaining a confirmation message corresponding to successful activation of the PDP link from the authentication network element.

* * * * *